Nov. 24, 1970                J. L. M. REIJNDERS                3,543,130
                              D.C. VOLTAGE CONVERTER
Filed June 21, 1968                                          2 Sheets-Sheet 1

INVENTOR.
JOSEPH L.M. REIJNDERS
BY
Frank R. Trifari
AGENT

United States Patent Office 3,543,130
Patented Nov. 24, 1970

3,543,130
D.C. VOLTAGE CONVERTER
Joseph Lodewijk Maria Reijnders, Emmasingel, Eindhoven, Netherlands, assignor, by mesne assignments, to U.S. Philips Corporation, New York, N.Y., a corporation of Delaware
Filed June 21, 1968, Ser. No. 740,826
Claims priority, application Netherlands, June 27, 1967, 6708900
Int. Cl. H02m *3/22;* H02p *13/22*
U.S. Cl. 321—2     13 Claims

ABSTRACT OF THE DISCLOSURE

A regulated D.C. voltage converter comprising a first thyristor for charging a capacitor and a second thyristor for discharging the capacitor into a load. The thyristors are sequentially triggered at a frequency that varies with the output voltage. An auxiliary charge circuit including a resistor is connected to the capacitor to supply a quantity of energy thereto that varies as a function of said trigger frequency.

---

This invention relates to a D.C. voltage converter comprising a capacitor charged, through a first controlled rectifier, by a source of supply voltage to be transformed, a transformer the primary winding of which is connected in parallel with the capacitor through a second controlled rectifier, a rectifier with smoothing filter connected to the secondary winding of said transformer, and a control device for triggering the controlled rectifiers as a function of the direct output voltage each time the second after the first, so that the output voltage, which increases with the switching frequency of the controlled rectifiers, is substantially independent of the supply voltage and the load within the working range of the converter.

Such converters are known from, for example, the "Controlled Rectifier Manual" of the General Electric Co., 1st ed., p. 108, last four lines, and p. 109, Fig. 8.3 and the first 13 lines. A property of such converters is that for a comparatively small load or in the substantially unloaded condition, the switching frequency must decrease very strongly to inhibit an increase in the direct output voltage. On the other hand, at full load and minimum value of the supply voltage, the switching frequency must become high enough to maintain the desired direct output voltage. Since the upper frequency is limited, for example, to approximately 10 kc./s. because of the period of restoration and the inertia of the controlled rectifiers employed, its minimum operational value becomes comparatively low. A low minimum switching frequency requires the use of a comparatively large and expensive smoothing filter.

An object of the invention is to eliminate this disadvantage in practice. The invention is based upon the concept that the energy supplied to the capacitor per working cycle can be decreased with the switching frequency in a simple manner so that a smaller range of switching frequencies becomes sufficient for the same regulating range.

The converter according to the invention is characterized in that it comprises at least a first auxiliary circuit by which the capacitor, after being discharged through the second controlled rectifier, is slowly charged in the opposite direction prior to being charged again through the first controlled rectifier. As a result, the switching frequency remains comparatively high even with a very low load.

An important factor which may limit the maximum switching frequency is the fact that the magnetizing current flowing through the primary winding of the transformer can maintain the second controlled rectifier conducting, even after the capacitor has been completely discharged and no longer supplies current to the output rectifier. This is especially true if the magnetizing current finds no other way to be dissipated, notably when using a half-wave rectifier for producing the direct output voltage. A half-wave rectifier is efficient and is usually employed in converters of the type specified.

In such a case the converter preferably includes a second auxiliary circuit comprising an auxiliary winding of the transformer and a rectifier and through which the magnetizing energy of the transformer is periodically removed after the second controlled rectifier has become conducting, so that the second rectifier extinguishes sooner and the switching frequency can be raised further.

In order that the invention may be readily carried into effect it will not be described in detail, by way of example, with reference to the accompanying diagrammatic drawings, in which.

Figure 1:
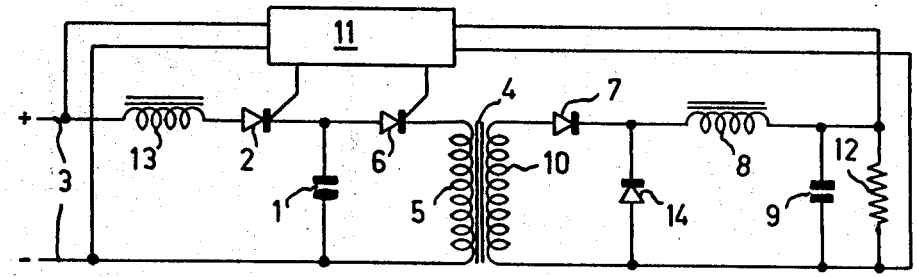
FIG. 1 shows the diagram of a D.C. voltage converter of the type to which the invention relates.

The known D.C. voltage converter shown diagrammatically in FIG. 1 comprises a capacitor 1 which is charged through a first thyristor or controlled rectifier 2, for example, a controlled semiconductor rectifier, from a source 3 of D.C. supply voltage to be transformed. A transformer 4 has a primary winding 5 connected in parallel with capacitor 1 through a second controlled rectifier 6. A rectifier 7 and a smoothing filter, comprising a choke coil 8 and a parallel capacitor 9, are connected to the secondary winding 10 of transformer 4. A control device 11 is connected so that the controlled rectifiers 2 and 6 are sequentially triggered each time, the second (6) after the first (2), as a function of the direct output voltage across capacitor 9 and a load 12 connected in parallel therewith. The converter shown also includes an inductor 13 connected in series with the first controlled rectifier 2 between the supply voltage source 3 and capacitor 1. A free-wheeling diode 14 is connected in parallel with the series-combination of choke coil 8 and smoothing capacitor 9.

The control device 11 is energized from the source 3. It includes a measuring device which compares an adjusted portion of the direct voltage set up across the load 12 to a reference voltage, and a pulse generator which, as a function of this comparison, supplies a first igniting pulse to the control electrode of the first controlled rectifier 2, for example, at the instant $t_1$, FIG. 2, and, with a fixed delay longer than a half period $(t_1-t_2)$ of the circuit comprising inductor 13 and capacitor 1, supplies a second igniting pulse to the control electrode of the second controlled rectifier 6, for example, at the instant $t_3$.

The maximum charge voltage $V_{1max}$ of capacitor 1 is thus increased due to its being charged through inductor 13 and the first controlled rectifier 2 in a resonant manner.

The electrical energy accumulated in choke coil 8 at the end of each period of conduction of rectifier 7 is transmitted, during each period of blocking, through free-wheeling diode 14 to smoothing capacitor 9 and the load 12.

The ratio between the output voltage $V_{12}$ and the input voltage $V_3$ is proportional with the root of the switching frequency $f_{11}$ at which the controlled rectifiers 2 and 6 are triggered (each time sequentially the second after the first), since during each period of the switching frequency $f_{11}$ an energy equal to $\frac{1}{2}C_1\Delta V_1^2$ is transferred from the supply voltage source 3 to the primary winding 5 of transformer 4. $C_1$ is the capacitance of capacitor 1 and $\Delta V_1$ is the difference between its voltage at the end ($t_2$) and at the beginning ($t_1$) of the charging cycle. $C_1$ is constant and, if the supply voltage $V_3$ is constant, $\Delta V_1$ is likewise substantially constant. The usable working range of the converter is thus limited, on the one hand by the maximum switching frequency so that, for a given value of $C_1$, the maximum load current is limited, and on the other hand, by the maximum switching frequency corresponding to a minimum load current.

The maximum switching frequency is limited by the properties of the controlled rectifiers employed. It will be, for example, on the order of magnitude of 10 kc./s. for controlled semiconductor rectifiers. On the other hand, the smoothing filter 8, 9 has to be proportioned for the minimum switching frequency so that a decrease in this frequency results in an increase in the inductance of choke coil 8 and in the capacitance of smoothing capacitor 9. However, an increase in this inductance and possibly in this capacitance implies an objectionable increase in volume, weight and price of the converter. If, for example, the minimum load current is equal to one tenth of the maximum load current and if the maximum supply voltage is 1.4 times the minimum supply voltage, then the minimum switching frequency is equal to one twentieth of the maximum switching frequency or, at a maximum switching frequency of 10 kc./s., it is equal to 500 c./s.

Figure 3:
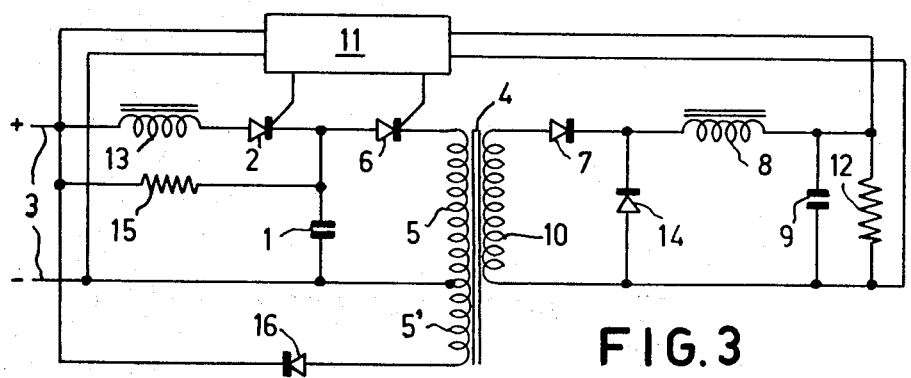
FIG. 3 shows the diagram of one embodiment of the converter according to the invention.

According to the invention, the minimum switching frequency is increased in that, upon a decrease in the switching frequency, the energy supplied to the primary winding 5 of transformer 4 during each period of capacitor 1 is at the same time decreased. As shown in FIG. 3, for this purpose a first auxiliary circuit is used comprising a resistor 15 which is connected in parallel with the series-combination of the first controlled rectifier 2 and inductor 13. Furthermore, the transformer 4 is provided with a second auxiliary circuit comprising an auxiliary winding 5' connected to the supply source 3 through a rectifier 16.

Figure 2:
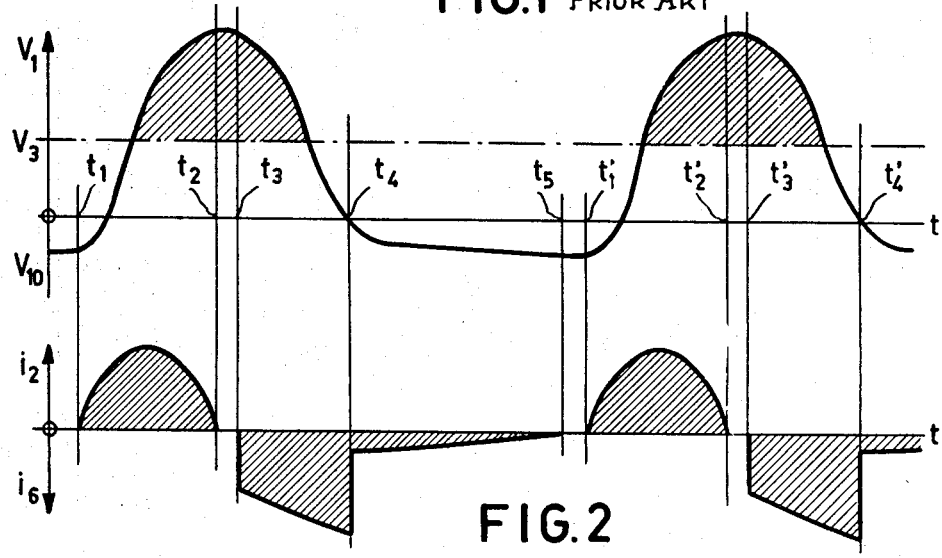
FIG. 2 shows several voltage-time and current-time diagrams which clarify the operation of this converter.

Without the elements 15, 5' and 16 the behaviour of the converter is as shown in FIG. 2.

When the first controlled rectifier 2 begins to conduct at the instant $t_1$ the capacitor 1 is charged in a resonant manner through the said rectifier and inductor 13 so that a semi-sinusoidal current pulse $i_2$ flows through rectifier 2. The current $i_2$ is suppressed at the instant $t_2$ so that controlled rectifier 2 is cut-off. After the period of conduction $t_1 - t_2$ of the controlled rectifier 2, the second controlled rectifier 6 is made to conduct, for example, at the instant $t_3$. The energy stored in capacitor 1 is transferred to the load 12 through said rectifier, transformer 4, rectifier 7 and smoothing filter 8, 9. A current pulse $i_6$ flows through the second controlled rectifier 6 between the instants $t_3$ and $t_4$. The capacitor 1 is completely discharged at the instant $t_4$ and the polarity of voltage across it changes, so that the current flowing through the second controlled rectifier 6 suddenly decreases considerably. However, this rectifier cannot be cut-off abruptly since the magnetising energy stored in the core of transformer 4 opposes this and causes a current to circulate through primary winding 5, capacitor 1 and controlled rectifier 6. Thus the current pulse $i_6$ is "long-tailed" between the instants $t_4$ and $t_5$, and the capacitor 1 is charged a little more strongly to a voltage $V_{10}$ in the reverse direction relative to the supply voltage $V_3$. The first controlled rectifier 2 may be made to conduct again immediately after the end of this tail, for example, at the instant $t_1'$.

Figure 4:
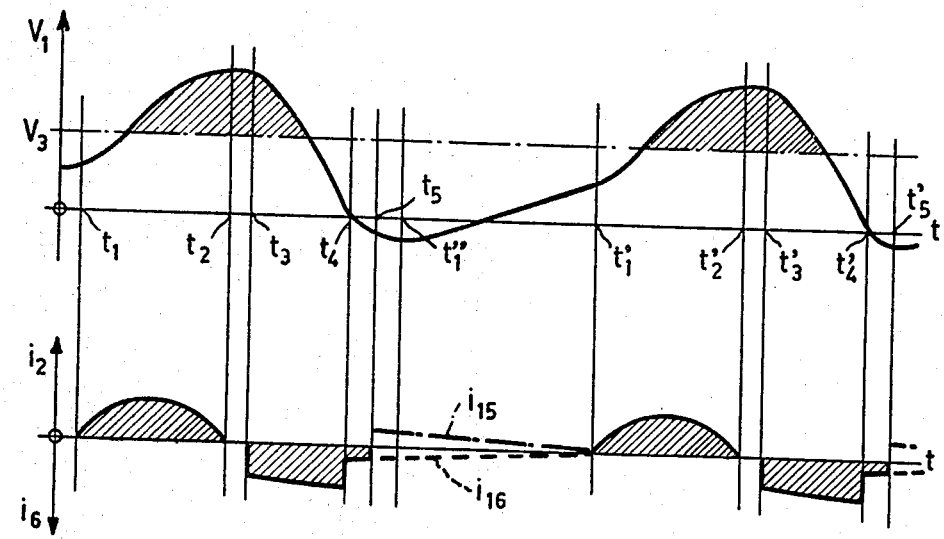
FIG. 4 shows diagrams for this embodiment which correspond to those of FIG. 2.

Due to the current $i_{15}$ which flows through resistor 15, the capacitor 1 is now recharged comparatively slowly by the supply source 3 between the instants $t_4$ and $t_1'$ (FIG. 4). At the instant $t_1'$, when the first controlled rectifier is again made to conduct, the potential difference $V_3 - V_{10} = \Delta V_1$ charging it, and the energy $\frac{1}{2}C_1 \cdot \Delta V_1^2$ absorbed by it, have become smaller. The decrease of $\Delta V_1$ is proportional to the time interval $t_4 - t_1'$ and hence approximately inversely proportional to the switching frequency $f_{11}$ of the converter. As a result, the frequency variation necessary to cover a predetermined regulating range becomes much smaller and the switching frequency remains comparatively high even for a very small load.

On the other hand, the magnetizing energy stored in the core of transformer 4 sets up a voltage at the auxiliary winding 5'. Shortly after the voltage $V_1$ across considerable decrease in the current and the consequent considerable decrease in the current $i_6$ flowing through the second controlled rectifier 6 at the instant $t_5$ (FIG. 4), this voltage exceeds the sum of the voltage $V_3$ from the supply source 3 and the threshold voltage of rectifier 16. From this instant onwards the circulating current flows through the said rectifier, as shown by $i_{15}$, and the tail of the current pulse $i_6$ is cut off by the second controlled rectifier. Thus the first controlled rectifier may again be made conductive shortly after the instant $t_5$, for example, at the instant $t_1''$, so that the maximum switching frequency may be chosen to be considerably higher.

Figure 5:
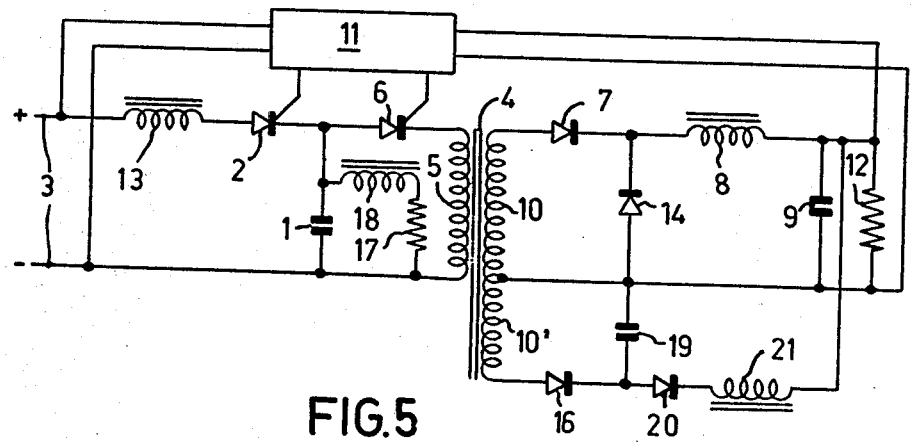
FIG. 5 shows the diagram of a second embodiment.

In the embodiment just described the current $i_{15}$ flowing through resistor 15 causes an energy loss $R_{15} \cdot i_{15}^2$ which cannot always be neglected. In the second embodiment shown in FIG. 5, the resistor 15 has therefore been replaced by the series-combination of a resistor 17 and an inductor 18 connected in parallel with capacitor 1. This series-combination causes a lower dissipation of energy and serves the same purpose as resistor 15 of FIG. 3.

In this second embodiment, the energy stored in the core of transformer 4 is also dissipated through an auxiliary winding 10' and a rectifier 16 to a capacitor 19, and through a further rectifier 20 and a choke coil 21 to the load 12. This second auxiliary circuit 10', 16, 19, 20, 21 fulfills the same function as the auxiliary circuit 5', 16 of FIG. 3, but has an additional regulating action.

The initial voltage $V_{10}$ of capacitor 1 becomes less negative indeed and the voltage jump $\Delta V_1 = V_3 - V_{10}$ becomes smaller as the adjusted output voltage $V_{12}$ is smaller, since this voltage polarizes the rectifiers 20 and 16 thus determining the portion of the magnetizing energy of transformer 4 which is still dissipated to capacitor 1 before the second controlled rectifier 6 is cut off. This portion of the magnetizing energy causes an increase in the reverse initial voltage $V_{10}$ of capacitor 1, and hence of $\Delta V_1$ and of the energy $\frac{1}{2}C_1 \cdot \Delta V_1^2$ absorbed per cycle, if $V_{12}$ is not chosen so low that the capacitor voltage $V_1$ lies close to zero when the second controlled rectifier 6 is cut off. The energy absorbed during each cycle thus increases with the adjusted output voltage $V_{12}$.

What is claimed is:

1. A voltage regulated power supply system comprising, input terminals connected to a source of supply voltage and output terminals for supplying a regulated voltage to a load, a capacitor, first and second thyristors, means serially connecting said capacitor and the first thyristor to said input terminals to provide a charge path for the capacitor, a transformer having a primary winding serially connected with said second thyristor in parallel with said capacitor to provide a discharge path for the capacitor, means connecting said output terminals to the secondary winding of said transformer, a control device responsive to the voltage at said output terminals and coupled to the control electrodes of said first and second thyristorse for sequentially triggering said first and second thyristors into conduction, in the order named, at a frequency which varies as a function of the output voltage, a first auxiliary circuit connected to said capacitor so that, after the capacitor is discharged via the second thyristor, it provides a second charge path by means of which the capacitor is slowly charged in the opposite direction prior to the triggering of said first thyristor at the start of the next cycle.

2. A system as claimed in claim 1 further comprising an input inductor connected in series with the first thyristor so as to charge the capacitor in a resonant manner to a voltage level that is higher than the supply voltage, said first auxiliary circuit comprising a resistor connected in parallel with the series-combination of the input inductor and the first thyristor.

3. A system as claimed in claim 1 wherein the first auxiliary circuit comprises a resistor connected in parallel with the capacitor.

4. A system as claimed in claim 3, wherein the first auxiliary circuit comprises an auxiliary inductor connected in series with said resistor.

5. A system as claimed in claim 1 further comprising a second auxiliary circuit comprising an auxiliary winding of the transformer and a rectifier connected in circuit so as to provide a circuit path for dissipating the magnetizing energy of the transformer after the second thyristor passes current thereby to shorten the conduction period of said second thyristor.

6. A system as claimed in claim 5 further comprising, means connecting the second auxiliary circuit to the input terminals of the system so that the magnetizing energy of the transformer is fed back to the supply voltage source.

7. A system as claimed in claim 5 further comprising, means connecting the second auxiliary circuit to the voltage output terminals of the system so that the magnetizing energy of the transformer is supplied to the system load.

8. A system as claimed in claim 7 further comprising a rectifier and a filter connected between said secondary winding and said output terminals to produce a D.C. voltage at said output terminals, and said second auxiliary circuit includes a separate smoothing filter.

9. A system as claimed in claim 8 wherein the second auxiliary circuit further includes a second rectifier connected in series with the other rectifier of the second auxiliary circuit, the separate smoothing filter comprising a capacitor connected in parallel with the series-combination of said auxiliary winding and said other rectifier, and a choke coil connected between the second rectifier and a corresponding direct-voltage output terminal of the system.

10. A regulated D.C. voltage converter comprising, a source of direct voltage, a capacitor, first and second controlled rectifiers, a transformer having a primary winding and a secondary winding, means serially connecting said first controlled rectifier and said capacitor across said voltage source, means serially connecting said second controlled rectifier and said primary winding across said capacitor, rectifier means connected to the secondary winding to provide a D.C. voltage at the converter output terminals, means coupled to the control electrodes of said first and second controlled rectifiers for sequentially triggering said rectifiers at a given frequency that varies inversely with the amplitude of the D.C. output voltage so that said output voltage is substantially independent of the voltage source and the load, and an auxiliary charge circuit connected to said capacitor so as to supply a quantity of electrical energy to said capacitor in each working cycle that varies as a function of said given frequency.

11. A converter as claimed in claim 10 wherein said auxiliary circuit comprises a resistor directly connecting one terminal of the capacitor to said voltage source.

12. A converter as claimed in claim 10 further comprising an auxiliary winding inductively coupled to said transformer windings, a rectifier, and means serially connecting said auxiliary winding and said rectifier to the voltage source so that the magnetizing energy of the transformer is fed back to said voltage source.

13. A converter as claimed in claim 10 further comprising an auxiliary winding inductively coupled to said transformer windings, a rectifier, and means serially connecting said auxiliary winding and said rectifier to the converter output terminals so that the magnetizing energy of the transformer is supplied to the converter load.

References Cited
UNITED STATES PATENTS

| | | | |
|---|---|---|---|
| 2,676,295 | 4/1954 | Douma | 321—2 |
| 3,392,285 | 7/1968 | Olson | 320—1 X |
| 3,418,556 | 12/1968 | Greenberg et al. | 321—16 |
| 3,439,251 | 4/1969 | Schaefer | 321—18 X |

WILLIAM H. BEHA, JR., Primary Examiner

U.S. Cl. X.R.
320—1; 321—18